(12) United States Patent
Gebhart et al.

(10) Patent No.: US 7,527,175 B2
(45) Date of Patent: May 5, 2009

(54) METERING OF CATALYSTS

(75) Inventors: Hermann Gebhart, Böhl-Iggelheim (DE); Volker Dolle, Bensheim (DE); Klaus-Peter Mayer, Ludwigshafen (DE); Elisabeth Glattki-Mayer, legal representative, Ludwigshafen (DE); Angel Sanchez, Tarragona (ES); Herbert Plötz, Schifferstadt (DE); Peter Götz, Böhl-Iggelheim (DE); Franz Langhauser, Ruppertsberg (DE)

(73) Assignee: Basell Polyolefine GmbH, Wesseling (DE)

( * ) Notice: Subject to any disclaimer, the term of this patent is extended or adjusted under 35 U.S.C. 154(b) by 623 days.

(21) Appl. No.: 10/470,686

(22) PCT Filed: Jan. 30, 2002

(86) PCT No.: PCT/EP02/00919

§ 371 (c)(1),
(2), (4) Date: Nov. 15, 2005

(87) PCT Pub. No.: WO02/062462

PCT Pub. Date: Aug. 15, 2002

(65) Prior Publication Data

US 2006/0160964 A1    Jul. 20, 2006

(30) Foreign Application Priority Data

Feb. 2, 2001 (DE) ................................ 101 05 276

(51) Int. Cl.
*G01F 22/00* (2006.01)
*C08F 2/00* (2006.01)
*C08F 10/06* (2006.01)

(52) U.S. Cl. ............................ 222/226; 222/1; 222/505; 526/89; 526/919; 526/920

(58) Field of Classification Search ................. 526/919, 526/920, 89; 222/1, 226, 505
See application file for complete search history.

(56) References Cited

U.S. PATENT DOCUMENTS 3,726,845 A * 4/1973 Nickerson .................... 526/159

(Continued)

FOREIGN PATENT DOCUMENTS

CN    1210029    3/1993

(Continued)

OTHER PUBLICATIONS

Suga Michiharu, "Supplying Method for Catalyst," *Patent Abstracts of Japan 007*:No. 171, Abstract of JP 58 079533 (Mitsui Petrochem Ind Ltd), (May 13, 1983).

*Primary Examiner*—Fred M Teskin
(74) *Attorney, Agent, or Firm*—Shao-Hua Guo

(57) ABSTRACT

To meter catalysts into a reactor, the catalyst is firstly suspended in a hydrocarbon in a reservoir and the suspension obtained is kept in motion by stirring and then fed via a three-way metering valve and an ejector into the actual reactor, wherein the suspension containing the catalyst is firstly discharged from the reservoir by means of a pump and continuously circulated by returning the suspension via the three-way metering valve within a closed piping system to the reservoir, subsequently setting a pressure in the reservoir which is from 0.1 to 30 bar higher than the pressure in the reactor and then continuously introducing the suspension into the reactor via a flow meter which controls the three-way metering valve and via a downstream ejector by pulse operation of the now open three-way metering valve.

11 Claims, 1 Drawing Sheet

U.S. PATENT DOCUMENTS

| | | | |
|---|---|---|---|
| 3,779,712 A | 12/1973 | Calvert et al. | 23/288 |
| 3,827,830 A | 8/1974 | Van Horn | 417/225 |
| 3,876,602 A | 4/1975 | Calvert et al. | 260/94.9 |
| 4,091,056 A * | 5/1978 | Hamalainen et al. | 261/19 |
| 4,123,601 A | 10/1978 | Kellum et al. | 526/79 |
| 4,188,132 A | 2/1980 | Lenart et al. | 366/314 |
| 4,330,645 A | 5/1982 | Juza et al. | 526/61 |
| 4,384,788 A | 5/1983 | Lenart et al. | 366/314 |
| 4,610,574 A | 9/1986 | Peters | 406/50 |
| 4,690,804 A | 9/1987 | Rohlfing | 422/219 |
| 4,857,613 A | 8/1989 | Zolk et al. | 526/128 |
| 5,288,824 A | 2/1994 | Kerth et al. | 526/128 |
| 5,356,599 A | 10/1994 | Miura et al. | 422/219 |
| 5,403,556 A | 4/1995 | Sosa et al. | 422/132 |

FOREIGN PATENT DOCUMENTS

| | | |
|---|---|---|
| DE | 2257669 | 6/1973 |
| DE | 3026816 | 2/1982 |
| DE | 19529240 | 2/1997 |
| EP | 0 000 512 | 2/1979 |
| EP | 0 025 137 | 3/1981 |
| EP | 0 031 417 | 7/1981 |
| EP | 0 038 478 | 10/1981 |
| EP | 0 045 975 | 2/1982 |
| EP | 0 086 473 | 8/1983 |
| EP | 0 171 200 | 2/1986 |
| EP | 0 045 977 B1 | 1/1987 |
| EP | 0 466 354 | 1/1992 |
| EP | 0 045 977 B2 | 3/1995 |
| GB | 0896786 | 5/1962 |
| GB | 2 111 066 | 6/1983 |

* cited by examiner

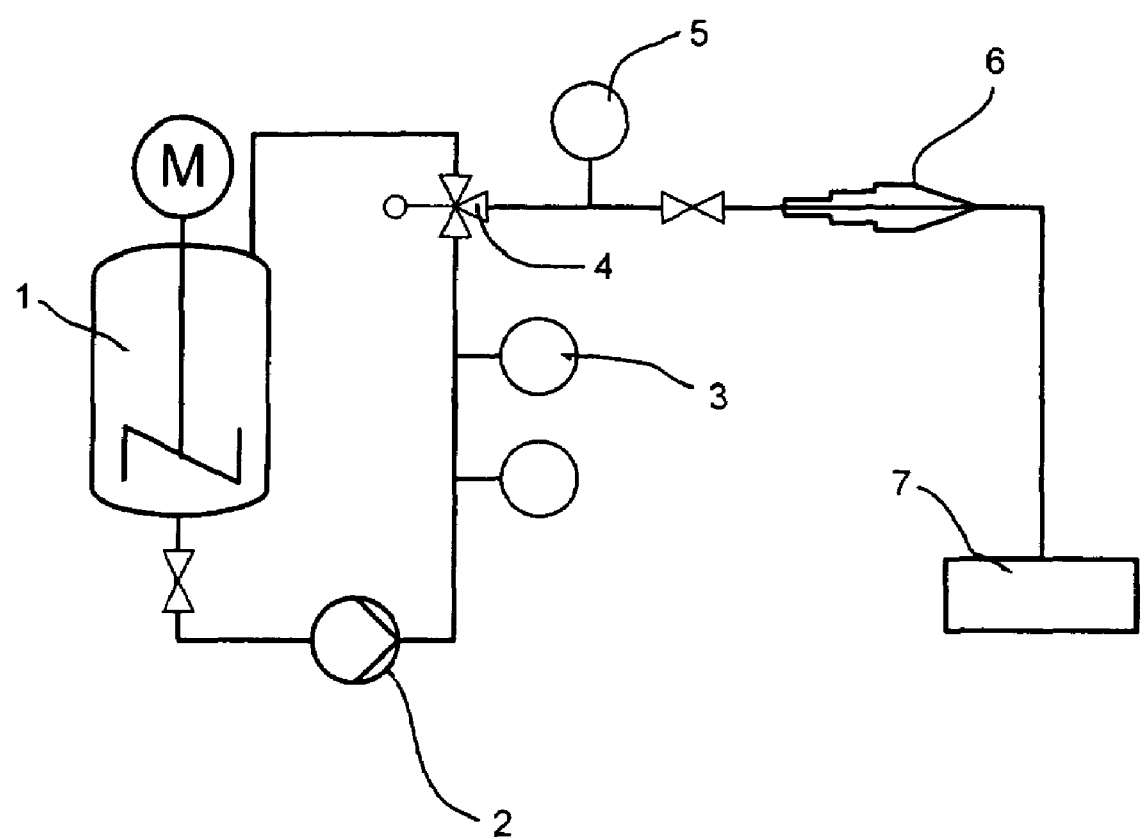

METERING OF CATALYSTS

CROSS-REFERENCE TO RELATED APPLICATIONS

This application is the U.S. national stage under 35 U.S.C. §371 of International Application PCT/EP02/00919, filed Jan. 30, 2002, claiming priority to German Patent Application No. 101 05 276.6, filed Feb. 2, 2001; the disclosures of International Application PCT/EP02/00919 and German Patent Application No. 101 05 276.6, each as filed, are incorporated herein by reference.

FIELD OF THE INVENTION

The present invention relates to a method of metering catalysts into a reactor, where the catalyst is firstly suspended in a hydrocarbon in a reservoir and the suspension obtained is kept in motion by stirring and then fed via a three-way metering valve and an ejector into the actual reactor, wherein the suspension containing the catalyst is firstly discharged from the reservoir by means of a pump and continuously circulated by returning the suspension via the three-way metering valve within a closed piping system to the reservoir, subsequently setting a pressure in the reservoir which is from 0.1 to 30 bar higher than the pressure in the reactor and then continuously introducing the suspension into the reactor via a flow meter which controls the three-way metering valve and via a downstream ejector by pulse operation of the now open three-way metering valve.

The present invention further provides an apparatus for metering catalysts which is suitable, inter alia, for the polymerization of $C_2$-$C_{20}$-olefins.

BACKGROUND OF THE INVENTION

Polymers of $C_2$-$C_{20}$-olefins can be prepared by liquid-phase polymerization, by polymerization in the monomer (bulk polymerization), by suspension polymerization or by polymerization from the gas phase. The polymerization is usually carried out with the aid of a Ziegler-Natta catalyst which customarily comprises a titanium-containing solid component, an organic aluminum compound and an organic silane compound (EP-B 45 977, EP-A 171 200, U.S. Pat. Nos. 4,857,613, 5,288,824). Polymers of $C_2$-$C_{20}$-olefins can, however, also be obtained by polymerization with the aid of metallocene compounds or polymerization-active metal complexes. An important aspect here is that the catalyst used is metered into the polymerization reactor in an efficient manner.

The known techniques for metering finely-divided catalysts for the preparation of polyolefins have mostly been established for decades. Many of these techniques do not take account of catalyst developments which have taken place. Thus, modern high-performance catalysts require particular homogeneity of metering even in the case of small amounts. The development of metallocene catalysts has also made it necessary for fully or partially active catalysts to be introduced into the process in a safe and reliable manner.

Current and established techniques of metering catalysts are predominantly based on a portioning device which via an appropriate conveying means feeds a particular volume element into the reactor.

Examples which may be mentioned are the methods described in EP-A 0 025 137 and in U.S. Pat. No. 4,690,804, in which a dimple feeder or double-check feeder takes portions of a sedimented suspension of the catalyst from a reservoir and, by rotation through 180°, passes it to a transport stream which conveys the suspension into the reactor. The disadvantage of this method is the fixed volume of the feeder. This has the consequence that at low outputs or high catalyst productivity the number of doses per hour is very low and the process can thus easily be upset. In addition, in the case of catalysts having a high activity, there is the risk that the catalyst will not be sufficiently quickly distributed homogeneously in the reactor, which can quickly lead to lump formation when the catalyst activity is high. A further disadvantage of metering a sedimented catalyst suspension is that the catalyst concentration decreases as the fill level of the metering vessel drops and the setting of the portioning device therefore has to be adjusted continually.

A further example of a metering method is that described, inter alia, in DE-A 22 57 669. Here, the catalyst is blown into the reactor by means of nitrogen. However, this method has the disadvantage that substantial quantities of nitrogen get into the reactor and reduce the partial pressure of the monomers; they can thus have an adverse effect on the activity and the efficiency of the catalyst system.

A further possibility is to meter the catalyst into the reactor via a lock system as described in U.S. Pat. No. 3,827,830 or U.S. Pat. No. 4,123,601. However, experience has shown that such lock systems, for example systems having ball valves, are difficult to operate reliably over a prolonged period in conjunction with inorganic materials. Typical wear phenomena are, inter alia, leaks and blocked valves. This is associated with increased maintenance requirements and high costs. These metering methods, too, convey the material in portions, with the abovementioned disadvantages.

DE-A 30 26 816 describes the metering of a catalyst suspension from a stock zone into a mixing zone via a valve. Constructions of this type tend to become blocked, particularly when the valve is open for prolonged periods. Controlled metering of defined amounts is thus not possible on a long-term basis. A mixing zone as described in this application is not suitable for metering activated or partially activated catalysts since deposit formation frequently occurs.

It is an object of the present invention to remedy the disadvantages indicated and to develop a new method of metering catalysts into a reactor, by means of which the catalyst used can be introduced continuously and very homogeneously into the reactor. The metering of the catalyst should occur so that very few impurities are carried into the reactor and so that the amount of catalyst metered in is measurable. Furthermore, the method of the present invention should be able to be carried out using a metering system which is largely free of moving parts having large sealing areas, since experience has shown that pronounced wear occurs in such places and can have an adverse effect on operational reliability and operating life.

We have found that this object is achieved by a new, significantly improved method of metering catalysts into a reactor, where the catalyst is firstly suspended in a hydrocarbon in a reservoir and the suspension obtained is kept in motion by stirring and then fed via a three-way metering valve and an ejector into the actual reactor, wherein the suspension containing the catalyst is firstly discharged from the reservoir by means of a pump and continuously circulated by returning the suspension via the three-way metering valve within a closed piping system to the reservoir, subsequently setting a pressure in the reservoir which is from 0.1 to 30 bar higher than the pressure in the reactor and then continuously introducing the suspension into the reactor via a flow meter which controls the three-way metering valve and via a downstream ejector by pulse operation of the now open three-way metering valve.

BRIEF DESCRIPTION OF THE DRAWING

FIG. 1 is an illustrative flow diagram of the polymerization process.

DESCRIPTION OF THE INVENTION

The method of the present invention is preferably used for metering catalysts for the polymerization of $C_2$-$C_{20}$-olefins. $C_2$-$C_{20}$-Olefins which can be used are, in particular, aliphatic $C_2$-$C_{20}$-alk-1-enes, particularly preferably $C_2$-$C_{10}$-alk-1-enes such as ethylene, propylene, 1-butene, 1-pentene, 1-hexene, 1-heptene or 1-octene, especially ethylene, propylene or 1-butene. Furthermore, the term $C_2$-$C_{20}$-olefins as used in the context of the present invention also encompasses, in particular, internal $C_4$-$C_{20}$-olefins such as 2-butene or isoprene, $C_4$-$C_{20}$-dienes such as 1,4-butadiene, 1,5-hexadiene, 1,9-decadiene, 5-ethylidene-2-norbornene, 5-methylidene-2-norbornene, also cyclic olefins such as norbornene or α-pinene or else trienes such as 1,6-diphenyl-1,3,5-hexatriene, 1,6-di-tert-butyl-1,3,5-hexatriene, 1,5,9-cyclododecatriene, trans,trans-farnesol, and also polyunsaturated fatty acids or fatty acid esters. The process is suitable for preparing homopolymers of $C_2$-$C_{20}$-olefins or copolymers of $C_2$-$C_{20}$-olefins with, preferably, up to 30% by weight of other copolymerized olefins having up to 20 carbon atoms. For the purposes of the present invention, copolymers include both random copolymers and block or high-impact copolymers.

The method of the present invention is particularly useful for metering catalysts in the preparation of homopolymers of propylene or copolymers of propylene with up to 30% by weight of other copolymerized olefins having up to 10 carbon atoms. The copolymers of propylene may be random copolymers or block or high-impact copolymers. If the copolymers of propylene have a random structure, they generally contain up to 15% by weight, preferably up to 6% by weight, of other olefins having up to 10 carbon atoms, in particular ethylene, 1-butene or a mixture of ethylene and 1-butene.

The block or high-impact copolymers of propylene are polymers in which a propylene homopolymer or a random copolymer of propylene with up to 15% by weight, preferably up to 6% by weight, of other olefins having up to 10 carbon atoms is prepared in a first stage and a propylene-ethylene copolymer which has an ethylene content of from 5 to 99% by weight and may further comprise additional $C_4$-$C_{10}$-olefins is then polymerized onto it in the second stage. In general, the amount of propylene-ethylene copolymer polymerized on in the second stage is such that the copolymer produced in the second stage makes up from 3 to 90% by weight of the end product.

Catalysts which can be used are, inter alia, Phillips catalysts based on chromium compounds or Ziegler catalysts. The method of the present invention is also suitable, inter alia, for metering Ziegler-Natta catalyst systems, in particular catalyst systems comprising not only a titanium-containing solid component a) but also cocatalysts in the form of organic aluminum compounds b) and optionally electron donor compounds c).

However, Ziegler-Natta catalyst systems based on metallocene compounds or polymerization-active metal complexes can also be metered by means of the method of the present invention.

Titanium compounds used for preparing the titanium-containing solid component a) are generally the halides or alkoxides of trivalent or tetravalent titanium. Titanium alkoxide halide compounds or mixtures of various titanium compounds are also suitable. Preference is given to using those titanium compounds containing chlorine as halogen. Preference is likewise given to titanium halides which consist of only titanium and halogen, especially titanium chlorides and in particular titanium tetrachloride.

The titanium-containing solid component a) preferably comprises at least one halogen-containing magnesium compound. For the present purposes, halogens are chlorine, bromine, iodine and fluorine, with preference being given to bromine or, in particular, chlorine. The halogen-containing magnesium compounds can either be used directly in the preparation of the titanium-containing solid component a) or be formed during its preparation. Magnesium compounds which are suitable for preparing the titanium-containing solid component a) are especially magnesium halides, in particular magnesium dichloride or magnesium dibromide, or magnesium compounds from which the halides can be obtained in a customary manner, e.g. by reaction with halogenating agents, for example magnesium alkyls, magnesium aryls, magnesium alkoxy compounds or magnesium aryloxy compounds or Grignard compounds. Preferred examples of halogen-free compounds of magnesium which are suitable for preparing the titanium-containing solid component a) are n-butylethylmagnesium or n-butyloctylmagnesium. Preferred halogenating agents are chlorine and hydrogen chloride. However, the titanium halides can also serve as halogenating agents.

In addition, the titanium-containing solid component a) advantageously comprises electron donor compounds, for example monofunctional or polyfunctional carboxylic acids, carboxylic anhydrides or carboxylic esters, also ketones, ethers, alcohols, lactones or organophosphorus or organosilicon compounds.

As electron donor compounds within the titanium-containing solid component, preference is given to using carboxylic acid derivatives and in particular phthalic acid derivatives of the formula (II)

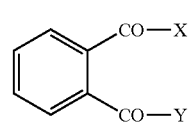

(II)

where X and Y are each a chlorine or bromine atom or a $C_1$-$C_{10}$-alkoxy radical or together represent oxygen in an anhydride function. Particularly preferred electron donor compounds are phthalic esters in which X and Y are each a $C_1$-$C_8$-alkoxy radical.

Examples of preferred phthalic esters are diethyl phthalate, di-n-butyl phthalate, diisobutyl phthalate, di-n-pentyl phthalate, di-n-hexyl phthalate, di-n-heptyl phthalate, di-n-octyl phthalate and di-2-ethylhexyl phthalate.

Further preferred electron donor compounds within the titanium-containing solid component are aliphatic or cycloaliphatic diethers or else diesters of 3- or 4-membered, substituted or unsubstituted cycloalkane-1,2-dicarboxylic acids, and also monoesters of substituted benzophenone-2-carboxylic acids or substituted benzophenone-2-carboxylic acids. As hydroxy compounds for forming these esters, use is made of the alkanols customary in esterification reactions, for example $C_1$-$C_{15}$-alkanols or $C_5$-$C_7$-cycloalkanols, which may in turn bear one or more $C_1$-$C_{10}$-alkyl groups, and also $C_6$-$C_{10}$-phenols.

It is also possible to use mixtures of various electron donor compounds.

In the preparation of the titanium-containing solid component a), use is generally made of from 0.05 to 2.0 mol, preferably from 0.2 to 1.0 mol, of the electron donor compounds per mole of magnesium compound.

In addition, the titanium-containing solid component a) may comprise inorganic oxides as supports. In general, a finely divided inorganic oxide which has a mean particle diameter of from 5 to 200 μm, preferably from 10 to 70 μm, is used as support. Here, the mean particle diameter is the volume-based mean (median) of the particle size distribution determined by Coulter counter analysis.

The particles of the finely divided inorganic oxide are preferably composed of primary particles having a mean particle diameter of from 1 to 20 μm, in particular from 1 to 5 μm. The primary particles are porous, granular oxide particles which are generally obtained by milling a hydrogel of the inorganic oxide. It is also possible to sieve the primary particles before they are processed further.

Furthermore, the inorganic oxide which is preferably used also has voids and channels having a mean diameter of from 0.1 to 20 μm, in particular from 1 to 15 μm, and having a macroscopic proportion by volume of the total particle in the range from 5 to 30%, in particular in the range from 10 to 30%.

The mean particle diameters of the primary particles and the macroscopic proportion by volume of the voids and channels of the inorganic oxide are advantageously determined by image analysis using scanning electron microscopy or electron probe microanalysis, in each case on particle surfaces and particle cross sections of the inorganic oxide. The micrographs obtained are evaluated and the mean particle diameters of the primary particles and the macroscopic proportion by volume of the voids and channels are determined therefrom. Image analysis is preferably carried out by converting the electron-microscopic data material into a halftone binary image and digital evaluation by means of a suitable EDP program, e.g. the software package Analysis from SIS.

The inorganic oxide which is preferably used can be obtained, for example, by spray drying the milled hydrogel, which for this purpose is mixed with water or an aliphatic alcohol. Such finely divided inorganic oxides are also commercially available.

Furthermore, the finely divided inorganic oxide usually has a pore volume of from 0.1 to 10 cm$^3$/g, preferably from 1.0 to 4.0 cm$^3$/g, and a specific surface area of from 10 to 1000 m$^2$/g, preferably from 100 to 500 m$^2$/g. The values specified here are the values determined by mercury porosimetry in accordance with DIN 66133 and by nitrogen adsorption in accordance with DIN 66131, respectively.

It is also possible to use an inorganic oxide whose pH, i.e. the negative logarithm to the base ten of the proton concentration, is in the range from 1 to 6.5, in particular in the range from 2 to 6.

Suitable inorganic oxides are, in particular, the oxides of silicon, aluminum, titanium or one of the metals of main groups I and II of the Periodic Table. Particularly preferred oxides are aluminum oxide, magnesium oxide, sheet silicates and especially silicon oxide (silica gel). It is also possible to use mixed oxides such as aluminum silicates or magnesium silicates.

The inorganic oxides used as supports have water present on their surface. This water is partly physically bound by adsorption and partly chemically bound in the form of hydroxyl groups. The water content of the inorganic oxide can be reduced or completely eliminated by thermal or chemical treatment. In a chemical treatment, use is generally made of customary desiccants such as SiCl$_4$, chlorosilanes or aluminum alkyls. The water content of suitable inorganic oxides is from 0 to 6% by weight. Preference is given to using an inorganic oxide in the form in which it is commercially obtainable, without further treatment.

The magnesium compound and the inorganic oxide are preferably present in the titanium-containing solid component a) in such amounts that from 0.1 to 1.0 mol, in particular from 0.2 to 0.5 mol, of the compound of magnesium is present per mole of inorganic oxide.

Furthermore, $C_1$-$C_8$-alkanols such as methanol, ethanol, n-propanol, isopropanol, n-butanol, sec-butanol, tert-butanol, isobutanol, n-hexanol, n-heptanol, n-octanol or 2-ethylhexanol or mixtures thereof are generally used in the preparation of the titanium-containing solid component a). Preference is given to using ethanol.

The titanium-containing solid component can be prepared by methods known per se. Examples of such methods are described, inter alia, in EP-A 45 975, EP-A 45 977, EP-A 86 473, EP-A 171 200, GB-A 2 111 066, U.S. Pat. Nos. 4,857, 613 and 5,288,824. The process known from DE-A 195 29 240 is preferably employed.

Suitable aluminum compounds b) include not only trialkylaluminums but also compounds of the type in which an alkyl group is replaced by an alkoxy group or by a halogen atom, for example by chlorine or bromine. The alkyl groups may be identical or different. Linear or branched alkyl groups are possible. Preference is given to using trialkylaluminum compounds whose alkyl groups each have from 1 to 8 carbon atoms, for example trimethylaluminum, triethylaluminum, triisobutylaluminum, trioctylaluminum or methyldiethylaluminum or mixtures thereof.

Apart from the aluminum compound b), electron donor compounds c) such as monofunctional or polyfunctional carboxylic acids, carboxylic anhydrides or carboxylic esters, also ketones, ethers, alcohols, lactones and organophosphorus and organosilicon compounds are generally used as further cocatalyst. The electron donor compounds c) can be identical to or different from the electron donor compounds used for preparing the titanium-containing solid component a). Preferred electron donor compounds here are organosilicon compounds of the formula (I)

$$R^1_n Si(OR^2)_{4-n} \tag{I}$$

where $R^1$ are identical or different and are each a $C_1$-$C_{20}$-alkyl group, a 5- to 7-membered cycloalkyl group which may in turn be substituted by $C_1$-$C_{10}$-alkyl, a $C_6$-$C_{18}$-aryl group or a $C_6$-$C_{18}$-aryl-$C_1$-$C_{10}$-alkyl group, $R^2$ are identical or different and are each a $C_1$-$C_{20}$-alkyl group and n is 1, 2 or 3. Particular preference is given to compounds in which $R^1$ is a $C_1$-$C_8$-alkyl group or a 5- to 7-membered cycloalkyl group and $R^2$ is a $C_1$-$C_4$-alkyl group and n is 1 or 2.

Among these compounds, particular mention may be made of dimethoxydiisopropylsilane, dimethoxyisobutylisopropylsilane, dimethoxydiisobutylsilane, dimethoxydicyclopentylsilane, dimethoxyisopropyl-tert-butylsilane, dimethoxyisobutyl-sec-butylsilane and dimethoxyisopropyl-sec-butylsilane.

The cocatalysts b) and c) are preferably used in such amounts that the atomic ratio of aluminum from the aluminum compound b) to titanium from the titanium-containing solid component a) is from 10:1 to 800:1, in particular from 20:1 to 200:1, and the molar ratio of the aluminum compound b) to the electron donor compound c) is from 1:1 to 250:1, in particular from 10:1 to 80:1.

The titanium-containing solid component a), the aluminum compound b) and the generally used electron donor compound c) together form the Ziegler-Natta catalyst system. The catalyst constituents b) and c) can be introduced into the reactor together with the titanium-containing solid component a) or as a mixture or individually in any order and subjected to activation there.

The method of the present invention can also be employed for metering Ziegler-Natta catalyst systems based on metallocene compounds or polymerization-active metal complexes into the reactor.

For the present purposes, metallocenes are complexes of transition metals with organic ligands, which together with compounds capable of forming metallocenium ions give active catalyst systems. For metering by the method of the present invention, the metallocene complexes are generally present in supported form in the catalyst system. Supports used are frequently inorganic oxides. Preference is given to the above-described inorganic oxides which are also used for preparing the titanium-containing solid component a).

Customarily used metallocenes contain titanium, zirconium or hafnium as central atoms, with zirconium being preferred. In general, the central atom is bound via a n bond to at least one, generally substituted, cyclopentadienyl group and to further substituents. The further substituents can be halogens, hydrogen or organic radicals, with preference being given to fluorine, chlorine, bromine or iodine or a $C_1$-$C_{10}$-alkyl group.

Preferred metallocenes contain central atoms which are bound via two π bonds to two substituted cyclopentadienyl groups, with particular preference being given to those in which substituents of the cyclopentadienyl groups are bound to both cyclopentadienyl groups. Very particular preference is given to complexes whose cyclopentadienyl groups are additionally substituted by cyclic groups on two adjacent carbon atoms.

Further preferred metallocenes are ones which contain only one cyclopentadienyl group which is, however, substituted by a radical which is also bound to the central atom.

Examples of suitable metallocene compounds are
ethylenebis(indenyl)zirconium dichloride,
ethylenebis(tetrahydroindenyl)zirconium dichloride,
diphenylmethylene-9-fluorenylcyclopentadienylzirconium
  dichloride,
dimethylsilanediylbis(3-tert-butyl-5-methylcyclopentadienyl)-zirconium dichloride,
dimethylsilanediylbis(2-methylindenyl)zirconium dichloride,
dimethylsilanediylbis(2-methylbenzindenyl)zirconium
  dichloride
dimethylsilanediylbis(2-methyl-4-phenylindenyl)zirconium
  dichloride,
dimethylsilanediylbis(2-methyl-4-naphthylindenyl)zirconium dichloride,
dimethylsilanediylbis(2-methyl-4-isopropylindenyl)zirconium dichloride and
dimethylsilanediylbis(2-methyl-4,6-diisopropylindenyl)zirconium
  dichloride and also the corresponding dimethylzirconium
compounds.

The metallocene compounds are either known or are obtainable by known methods.

The metallocene catalyst systems further comprise compounds capable of forming metallocenium ions. Suitable compounds are strong, uncharged Lewis acids, ionic compounds containing Lewis-acid cations or ionic compounds having Brönsted acids as cation. Examples are tris(pentafluorophenyl)borane, tetrakis(pentafluorophenyl)borate or salts of N,N-dimethylanilinium. Further suitable compounds capable of forming metallocenium ions are open-chain or cyclic aluminoxane compounds. These are usually prepared by reacting trialkylaluminums with water and are generally in the form of mixtures of both linear and cyclic chain molecules of various lengths.

In addition, the metallocene catalyst systems may comprise organometallic compounds of the metals of main groups I, II and III of the Periodic Table, e.g. n-butyllithium, n-butyl-n-octylmagnesium or triisobutylaluminum, triethylaluminum or trimethylaluminum.

The method of the present invention can be used for metering catalysts which are usually used in the polymerization of $C_2$-$C_{20}$-olefins. The polymerization can be carried out in at least one reaction zone, frequently in two or more reaction zones connected in series (reactor cascade), in the gas phase, in the liquid phase, in a slurry or in bulk. The reaction conditions in the actual polymerization can also be set so that the respective monomers are present in two different phases, for example partly in the liquid state and partly in the gaseous state (condensed mode).

It is possible to use the customary reactors employed for the polymerization of $C_2$-$C_{20}$-olefins. Suitable reactors are, for example, continuously operated horizontal or vertical stirred vessels, circulation reactors, loop reactors, multistage reactors or fluidized-bed reactors or else combinations of the abovementioned reactor technologies. The size of the reactors is not of critical importance for applicability of the method of the present invention. It depends on the output which is to be achieved in the reaction zone or in the individual reaction zones.

The method of the present invention can, however, also be used for metering catalysts into reactors in which the reaction carried out is not a polymerization but instead another organic or inorganic reaction, for example an oxidation reaction or a hydrogenation reaction.

In particular, reactors used are fluidized-bed reactors or horizontally or vertically stirred powder bed reactors. The reaction bed can comprise the polymer of $C_2$-$C_{20}$-olefins which is produced in the respective reactor.

According to a particularly preferred embodiment of the method of the present invention, the reaction is carried out in a reactor or in a cascade of reactors connected in series in which the pulverulent reaction bed is kept in motion by means of a vertical stirrer. Particularly useful stirrers of this type are free-standing helical stirrers. Such stirrers are known, for example, from EP-B 000 512 and EP-B 031 417. These reactors distribute the pulverulent reaction bed particularly uniformly. Examples of such pulverulent reaction beds are described in EP-B 038 478. The reactor cascade preferably comprises two tank-shaped reactors which are connected in series and are each provided with a stirrer and have a capacity of from 0.1 to 100 m$^3$, for example 12.5, 25, 50 or 75 m$^3$.

According to the method of the present invention for metering catalysts into reactors, the catalyst, for example the titanium-containing solid component in the case of Ziegler-Natta catalysts or the metallocene compound in the case of metallocene catalysts, is firstly suspended in a hydrocarbon in a reservoir. Suitable reservoirs are, inter alia, stirred vessels provided with a stirrer. Hydrocarbons which can be used are, in particular, aliphatic, aromatic or else olefinic $C_3$-$C_{30}$-hydrocarbons or mixtures of these. Particularly suitable hydrocarbons are, inter alia, hexane, heptane, isodecane or white oil or benzene, toluene or ethylbenzene, also linear or branched $C_2$-$C_{20}$-α-olefins such as 1-butene, 1-pentene, propylene or hexene. A particularly suitable suspension medium is, for example, white oil, namely a liquid mixture of saturated, aliphatic hydrocarbons.

The suspension obtained in this way is kept in motion by means of suitable stirrers, for example by means of anchor stirrers or blade stirrers. Particularly suitable stirrers include Viscoprop stirrers from Ekato. The stirrer speed is usually from 5 to 300 revolutions per minute, in particular from 10 to 150 revolutions per minute.

The catalyst-containing suspension is discharged from the reservoir by means of an appropriate pump and continuously circulated by being conveyed via the three-way metering valve within a closed piping system back into the reservoir. Pumps suitable for this purpose are, for example, displacement pumps or diaphragm pumps. Particularly well suited pumps are, inter alia, Cerex diaphragm pumps from Bran & Luebbe in Norderstedt. It is advisable to circulate the volume in the reservoir from 0.1 to 5 times, preferably from 0.5 to 2 times, per hour. The circulation is preferably monitored by means of a mass flow meter. For this purpose, it is possible to use, inter alia, mass flow meters of the trade name Promass from Endress & Hausser. The catalyst-containing suspension is metered into the reactor by firstly setting, by means of the three-way metering valve, a pressure in the reservoir which is from 0.1 to 30 bar, in particular from 0.5 to 15 bar, higher than the pressure in the reactor. The three-way metering valves used for this purpose preferably have only one plug (e.g. type 187037-/P, special construction type from Kaemmer).

Subsequently, by means of pulse operation of the now open three-way metering valve, the suspension is introduced continuously into the reactor via a flow meter which controls the three-way metering valve and via a downstream ejector. The catalyst-containing suspension is metered by pulse operation of the three-way metering valve which in the "open" position is open to a degree of from 1 to 100%, preferably from 10 to 100%, for a freely selectable time of preferably from 1 to 600 seconds, more preferably from 1 to 100 seconds. In the "closed" position, the three-way metering valve is open to a degree of from 0 to 100%, preferably from 0 to 10%, for a freely selectable time of preferably from 1 to 600 seconds, in particular from 1 to 100 seconds.

The amount of catalyst-containing suspension which has been metered in this way flows through a flow meter, preferably a "Promass instrument from Endress & Hausser, to check the amount of catalyst being metered. The three-way metering valve can be controlled by means of the output signal from the flow meter and the metering of the catalyst can thus be regulated in a closed loop. The catalyst-containing suspension is finally fed via an ejector into the reactor. Here, it may be advisable for an aliphatic or olefinic hydrocarbon, for example propylene, to be conveyed into the ejector.

Subsequently, the cocatalysts, for example the aluminum compound b) and the electron donor compounds c) in the case of Ziegler-Natta catalysts or the cocatalysts used in the case of metallocene catalysts, e.g. triethylaluminum or triisobutylaluminum, are firstly introduced into the reactor and, after addition of the appropriate monomers, the actual chemical reaction, for example the polymerization of the $C_2$-$C_{20}$-olefins, is then carried out.

The polymerization can be carried out under customary reaction conditions, preferably at from 40 to 150° C. and pressures of from 1 to 100 bar. Preference is given to temperatures of from 40 to 120° C., in particular from 60 to 100° C., and pressures of from 10 to 50 bar, in particular from 15 to 40 bar. The molar mass of the $C_2$-$C_{20}$-olefin polymers formed can be controlled and set by addition of regulators customary in polymerization technology, for example hydrogen. Apart from such molar mass regulators, it is also possible to use activity regulators, i.e. compounds which influence the catalyst activity, or antistatics. The latter prevent deposit formation on the reactor wall as a result of electrostatic charging. The $C_2$-$C_{20}$-olefin polymers generally have a melt flow rate (MFR) of from 0.1 to 4000 g/10 min, in particular from 0.2 to 200 g/10 min, at 230° C. under a weight of 2.16 kg. The melt flow rate corresponds to the amount of polymer pressed out of the test apparatus standardized in accordance with ISO 1133 over a period of 10 minutes at 230° C. and under a weight of 2.16 kg. Particular preference is given to polymers whose melt flow rate is from 2 to 80 g/10 min, at 230° C. under a weight of 2.16 kg.

The mean residence times in the reaction to which the method of the present invention is applied are in the customary ranges. The residence times in the polymerization of $C_2$-$C_{20}$-olefins are in the range from 0.1 to 10 hours, preferably in the range from 0.2 to 5 hours and in particular in the range from 0.3 to 4 hours.

The catalyst-metering apparatus which is likewise provided by the present invention is shown in FIG. 1 below. The apparatus preferably comprises a reservoir (1) in which the catalyst is suspended in a hydrocarbon and which is provided with a suitable stirrer and, connected thereto, a piping system provided with a pump (2) by means of which the contents of the reservoir are circulated and a three-way metering valve (4) which is connected via a further piping system provided with a flow meter (5) to an ejector (6) via which the suspension comprising the catalyst is fed into the reactor (7), for example by means of propylene.

It may be advisable for the piping system which circulates the contents of the reservoir in the apparatus of the present invention to be additionally provided with a mass flow meter (3).

The method of the present invention and the apparatus likewise provided by the present invention make it possible to introduce catalysts, for example for the polymerization of $C_2$-$C_{20}$-olefins, continuously and very homogeneously into a reactor, with virtually no interfering impurities being carried in and, in addition, the amount of catalyst metered in being measurable. The method of the present invention also has a high operational reliability and can be operated for a long time.

Various types of catalysts for, inter alia, the polymerization of $C_2$-$C_{20}$-olefins can be metered into reactors by means of the method of the present invention or the apparatus of the present invention. The resulting homopolymers, copolymers or mixtures of such polymers are particularly suitable for producing films, fibers or moldings.

EXAMPLES

Examples 1, 2, 3 and 5 and Comparative Examples A to C and E were carried out using a Ziegler-Natta catalyst system comprising a titanium-containing solid component a) prepared by the following method.

In a first step, a finely divided silica gel having a mean particle diameter of 30 μm, a pore volume of 1.5 cm$^3$/g and a specific surface area of 260 m$^2$/g was admixed with a solution of n-butyloctylmagnesium in n-heptane, using 0.3 mol of the magnesium compound per mole of $SiO_2$. The finely divided silica gel additionally had a mean particle size of the primary particles of 3-5 μm and had voids and channels which had a diameter of 3-5 μm and a macroscopic proportion by volume of the total particle of about 15%. The mixture was stirred at 95° C. for 45 minutes and then cooled to 20° C., after which 10 times the molar amount, based on the organomagnesium compound, of hydrogen chloride was passed into the mixture. After 60 minutes, the reaction product was admixed with 3 mol of ethanol per mole of magnesium while stirring continually. This mixture was stirred at 80° C. for 0.5 hour and subsequently admixed with 7.2 mol of titanium tetrachloride and 0.5 mol of di-n-butyl phthalate, in each case per 1 mol of magnesium. The mixture was subsequently stirred at 100° C. for 1 hour, and the solid obtained in this way was filtered off and washed a number of times with ethylbenzene.

The resulting solid product was extracted at 125° C. with a 10% strength by volume solution of titanium tetrachloride in ethylbenzene for 3 hours. The solid product was then separated from the extractant by filtration and washed with n-heptane until the washings contained only 0.3% by weight of titanium tetrachloride.

The titanium-containing solid component a) comprised
3.5% by weight of Ti
7.4% by weight of Mg
28.2% by weight of Cl.

In addition to the titanium-containing solid component a), triethylaluminum and organic silane compounds were used as cocatalysts, in a manner similar to the teachings of U.S. Pat. Nos. 4,857,613 and 5,288,824.

Example 1

A 100 l stirred vessel was charged with a 15% by weight suspension of the titanium-containing solid component a) in white oil (Winog 70). This suspension was circulated at a rate of 100 kg per hour via the attached pump. The three-way metering valve connected in the circuit was operated using an open time of 4 seconds at 45% and a closed time of 1 second at 0%. The amount of suspension metered in this way was conveyed via a flow meter and fed by means of an ejector operated by 240 kg/h of propylene into a continuously operated 12.5 $m^3$ polymerization reactor. A pressure which was 8.5 bar higher than that in the polymerization reactor was applied to the stirred vessel.

In addition, 0.3 kg of triethylaluminum per metric ton of fresh propylene (0.3 kg/t of fresh propylene) and 0.1 kg of isobutylisopropyldimethoxysilane per metric ton of fresh propylene and hydrogen as molar mass regulator in an amount of 110 g per metric ton of fresh propylene were metered into the polymerization reactor. Propylene and ethylene were subsequently polymerized under the conditions, i.e. temperature and pressure, indicated in Table I at an average residence time of 1.8 hours. The particle size distribution of the propylene-ethylene copolymer obtained, together with the standard deviations for the parameters pressure and temperature, are shown in Table I below.

Example 2

The procedure of Example 1 was repeated, but a higher pressure and a higher temperature were employed.

Comparative Example A

A 100 l stirred vesssel was charged with a 15% by weight suspension of the titanium-containing solid component in white oil (Winog 70). The catalyst was fed downward by means of a double check feeder installed at the bottom outlet of the vessel using a pause time of 80 seconds (closed position) and a metering time of 3 seconds (metering position) and conveyed into the reactor by means of 240 kg/h of propylene. The polymerization conditions correspond to those of Example 1. It can be seen from the data in Table I that the reaction parameters (cf. standard deviations) are subject to significantly greater fluctuations and the polymer morphology is significantly coarser.

Comparative Example B

The procedure of Comparative Example A was repeated, but the polymerization was carried out at 28 bar and 77° C. Over a period of three hours, the particle morphology became very coarse (more than 5% of particles >4 mm), so that the experiment had to be stopped.

Example 3

The polymerization was carried out as described in Example 1, but no ethylene was introduced.

Comparative Example C

The polymerization was carried out as described in Comparative Example A, but no ethylene was introduced and the pressure and temperature were altered. This experiment, too, shows that significantly greater fluctuations are found in the process when using the conventional method.

Example 4

The procedure of Example 1 according to the present invention was repeated, but a metallocene catalyst comprising rac-dimethylsilanediylbis(2-methylbenzo[e]indenyl)zirconium dichloride supported on silica gel was used in place of the titanium-containing solid component a) and no organic silane was introduced. In addition, 20 g of isopropanol per metric ton of fresh propylene were metered in.

Comparative Example D

The procedure of Comparative Example A was repeated, but the metallocene catalyst of Example 4 was used and no silane was introduced. 20 g of hydrogen per metric ton of fresh propylene were metered in. Only propylene was polymerized. The resulting propylene polymer displayed an increased proportion of coarse particles in the screening unit (particle size >4 mm).

Comparative Example E

A 100 l stirred vessel was charged with a 15% by weight suspension of the titanium-containing solid component a) in white oil (Winog 70). The catalyst-containing suspension was conveyed downward via a valve installed at the bottom outlet of the stirred vessel without prior circulation using a pause time of 2 seconds at the setting 0% and a metering time of 10 seconds at a setting of 90%. Underneath this outlet, a mixture of propylene and ethylene was polymerized under the same conditions as in Example 1. After the valve became blocked and had to be cleaned after less than 10 minutes, the experiment was stopped.

Example 5

Example 3 was repeated under analogous conditions, but the catalyst was suspended in propylene instead of white oil.

Table I below shows the respective pressure, the respective temperature and the amounts of monomer(s) used in the polymerization for Examples 1, 2, 3, 4 and 5 according to the present invention and for Comparative Examples A, C and D. The table also shows the respective standard deviations for pressure and temperature and the particle size distribution of the polymers obtained, determined by sieve analysis.

TABLE I

|  | Experiment No. | | | | | | | |
| --- | --- | --- | --- | --- | --- | --- | --- | --- |
|  | Ex. 1 | Ex. 2 | Comp. Ex. A | Ex. 3 | Comp. Ex. C | Ex. 4 | Comp. Ex. D | Ex. 5 |
| Pressure (bar) | 24.00 | 28.00 | 24.00 | 30.00 | 30.00 | 24.00 | 24.00 | 30.00 |
| Standard deviation of pressure (bar) | 0.72 | 0.78 | 0.89 | 0.55 | 0.74 | 0.45 | 0.52 | 0.54 |
| Temperature (° C.) | 72.00 | 77.00 | 72.00 | 80.00 | 80.00 | 67.00 | 67.00 | 80.00 |
| Standard deviation of temperature (° C.) | 1.36 | 0.53 | 6.01 | 0.82 | 3.16 | 0.30 | 0.35 | 0.73 |
| Amount of propylene (kg/h) | 1500.00 | 1500.00 | 1500.00 | 1800.00 | 1800.00 | 1800.00 | 1800.00 | 1800.00 |
| Amount of ethylene (kg/h) | 24.00 | 24.00 | 24.00 | 0 | 0 | 0 | 0 | 0 |
| Particle size distribution | | | | | | | | |
| >4 mm | 0 | 0.10 | 0.10 | 0 | 0 | 0 | 0.50 | 0 |
| >3.15 mm | 0.20 | 0.20 | 0.60 | 0 | 0 | 0 | 0.10 | 0 |
| >2 mm | 12.40 | 2.70 | 13.20 | 0.60 | 6.70 | 6.10 | 4.90 | 0.80 |
| >1 mm | 50.80 | 37.30 | 53.00 | 30.90 | 44.50 | 68.80 | 40.10 | 33.70 |
| >0.5 mm | 23.20 | 41.50 | 20.80 | 43.40 | 30.60 | 23.50 | 46.00 | 40.30 |
| >0.25 mm | 8.70 | 14.90 | 7.70 | 17.40 | 11.80 | 1.60 | 8.10 | 17.50 |
| >0.125 mm | 3.20 | 2.90 | 3.50 | 5.60 | 4.70 | 0 | 0.30 | 7.00 |
| >0.06 mm | 1.4 | 0.40 | 1.10 | 1.80 | 1.30 | 0 | 0 | 0.70 |
| >0.04 mm | 0.1 | 0 | 0 | 0.30 | 0.30 | 0 | 0 | 0 |
| <0.04 mm | 0 | 0 | 0 | 0 | 0.10 | 0 | 0 | 0 |

We claim:

1. A method of metering catalysts into a reactor, where the catalyst is firstly suspended in a hydrocarbon in a reservoir and the suspension obtained is kept in motion by stirring and then fed via a three-way metering valve and an ejector into the actual reactor, wherein the suspension containing the catalyst is firstly discharged from the reservoir by means of a pump and continuously circulated by returning the suspension via the three-way metering valve within a closed piping system to the reservoir, subsequently setting a pressure in the reservoir which is from 0.1 to 30 bar higher than the pressure in the reactor and then continuously introducing the suspension into the reactor via a flow meter which controls the three-way metering valve and via a downstream ejector by pulse operation of the now open three-way metering valve.

2. A method as claimed in claim 1, wherein the contents of the entire reservoir are circulated from 0.1 to 5 times per hour by means of a pump.

3. A method as claimed in claim 1, wherein the circulation of the contents of the entire reservoir is monitored by means of a mass flow meter.

4. A method as claimed in claim 1, wherein the pressure set in the reservoir is from 0.5 to 15 bar higher than the pressure in the reactor.

5. A method as claimed in claim 1, wherein propylene is conveyed continuously into the ejector.

6. A method as claimed in claim 1 by means of which Ziegler-Natta catalysts based on a titanium-containing solid component are metered into the reactor.

7. A method as claimed in claim 1 by means of which catalysts based on metal complexes are fed into the reactor.

8. A method as claimed in claim 1 used for metering catalysts for the polymerization of $C_2$-$C_{20}$-olefins.

9. A method as claimed in claim 1 used for metering catalysts for the polymerization of aliphatic $C_2$-$C_{10}$-alk-1-enes.

10. A method as claimed in claim 1, wherein the catalyst is suspended in a linear or branched $C_2$-$C_{20}$-α-olefin.

11. A method as claimed in claim 1, wherein the catalyst is suspended in propylene.

* * * * *